UNITED STATES PATENT OFFICE.

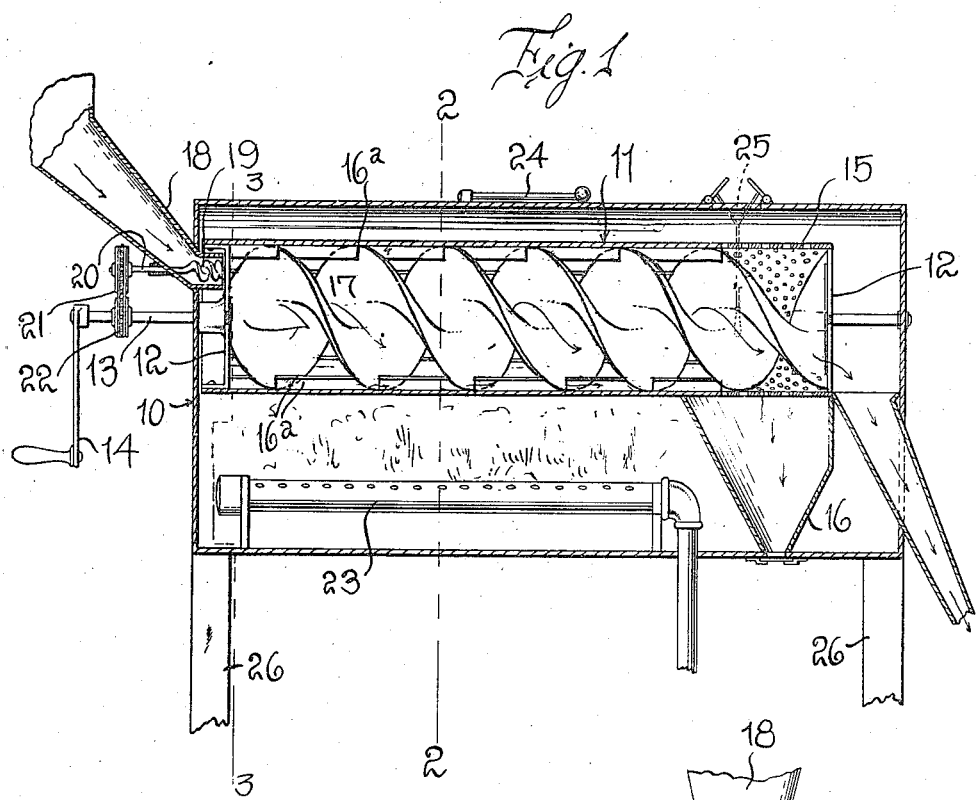
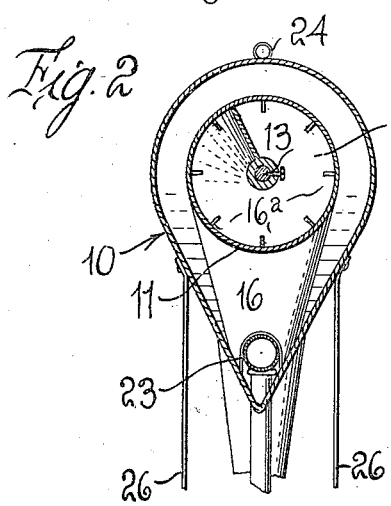
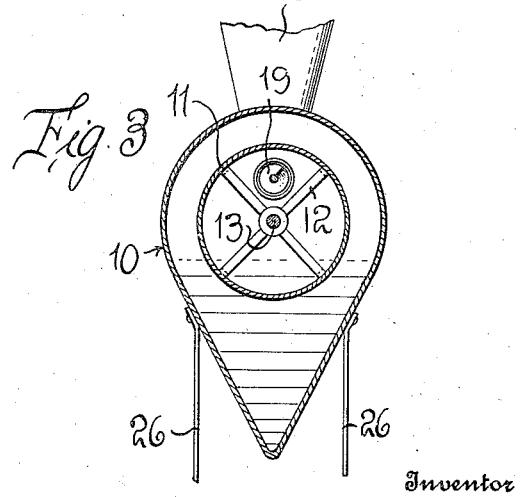

NEAL CROSS, OF ARDMORE, OKLAHOMA, ASSIGNOR OF ONE-HALF TO FRANK S. GATES, OF ARDMORE, OKLAHOMA.

INSECT-EXTERMINATOR.

1,229,236.　　　　Specification of Letters Patent.　　Patented June 12, 1917.

Application filed January 24, 1917. Serial No. 144,251.

*To all whom it may concern:*

Be it known that I, NEAL CROSS, a citizen of the United States, residing at Ardmore, in the county of Carter and State of Oklahoma, have invented certain new and useful Improvements in Insect-Exterminators, of which the following is a specification, reference being had to the accompanying drawings.

This invention relates to means for exterminating insects or insect germs and particularly to a machine for exterminating insects or insect germs in dried peas, beans, rice, fruit, wheat, oats, grain, and other like products.

The general object of my invention is to provide a machine of this character which shall be very simple in construction, thoroughly effective in action, and which will have few parts and be easily operated.

A further object of the invention is to provide a machine of this character so constructed that the material containing the germs or insects to be killed is fed through a cylinder or like casing and, while it is passing through this cylinder or casing, is subjected to a certain degree of heat which will be sufficient to kill any insects which may be present in the material, the machine being further so constructed that the insects will be separated from the material and dropped therefrom so as to leave the material in the best possible condition for use as food.

Other objects will appear in the course of the following description.

My invention is illustrated in the accompanying drawings, wherein

Figure 1 is a longitudinal sectional view of my machine;

Fig. 2 is a section on the line 2—2 of Fig. 1;

Fig. 3 is a section on the line 3—3 of Fig. 1.

In these drawings, 10 designates an outer casing which may be made of sheet metal or any other suitable material and which is semi-circular in cross section as regards its upper portion, and tapers downward and medially. Disposed in the semi-circular upper portion of the casing is a rotatable cylinder designated 11 which is mounted by spiders 12 upon a shaft 13, this shaft being provided at one end with any means whereby the shaft may be rotated, as for instance the crank 14. The cylinder is imperforate for nearly its entire length but at its end opposite the crank 14 the cylinder is provided with a perforated portion 15 and disposed below this perforated portion of the cylinder is a hopper 16. The end of the cylinder is open for the discharge of material contained therein and this open end of the cylinder may discharge into a chute 10$^a$. The cylinder is provided with a plurality of longitudinally extending ribs 16$^a$, these ribs extending inwardly and being spaced from each other any desired distance, the ribs being designed to tumble the material about which is disposed within the cylinder while it progresses from the forward end of the cylinder toward the rear thereof. As a means for carrying the material from one end of the cylinder to the other, I preferably provide within the cylinder a spiral or screw-shaped conveyer 17 which is relatively fixed, that is it is mounted upon the shaft 13 and rotates therewith, and with the cylinder, and the edges of this spiral blade 17 are notched to receive the edges of the relatively shallow ribs 16. It will thus be seen that, as the material is rotated within the cylinder, it will be carried longitudinally therealong from the entrance end of the cylinder to the discharge end thereof while, at the same time, the material will be tumbled about by the ribs.

At the inlet end of the casing, and mounted thereon in any suitable manner, is a receiving hopper 18 which discharges into the cylinder and preferably this receiving hopper carries at its lower end a feed screw 19 mounted upon a shaft 20, carrying a sprocket wheel 21, engaged by means of a sprocket chain with a sprocket wheel 22, mounted upon the shaft 13. Thus as the shaft 13 is operated, the screw feed will feed material from the hopper 18 into the interior of the cylinder in regulated quantities.

Disposed below the rotating cylinder 11 is a burner designated 23, of any suitable character, but illustrated as an oil or gas burner. This burner extends along and is equal in length to the imperforate portion of the cylinder 11 and is of course provided with means whereby the flames may be turned up or turned down so as to regulate the heat given off by the burner. A thermometer 24 is also provided upon the casing which will indicate the temperature within the drum or cylinder. A valved opening 25 is provided so that if there is an excess heat, that is if the temperature is too high, the heat may be allowed to pass off so as to lower the temperature, or if the temperature is too low, the valves or doors of this opening may be closed, thus causing the temperature to rise. Legs 26 are provided to support the casing but of course these details may be varied in many different ways without departing from the spirit of the invention. For instance, while I have illustrated a particular means for urging the material being treated through the drum or cylinder, I want it understood that other means might be used for this purpose which would accomplish the same result.

In the operation of this device the gasolene or gas burner is first lighted and the cylinder 11 is revolved until it reaches the required temperature, which is indicated by the thermometer 24. The hopper 18 is then filled and the product being treated will be discharged into the cylinder and conveyed forward therein and at the same time agitated by means of the screw 17 and the ribs 16ᵃ. The product being treated will be gradually conveyed toward the perforated end of the cylinder and the insects killed by the heat, and other foreign matter will be discharged through the perforations into the hopper 16. The cleaned product will pass onward and will be discharged through the open end of the cylinder into the discharge chute. Treating the products as above described kills the insects which may be thereon and also destroys any eggs, thus leaving the product wholesome and pure for food purposes.

Having described my invention, what I claim is:

1. Means for treating material to exterminate insects therein comprising a rotatable drum imperforate for the greater portion of its length but having perforations at one end and being open at this end, a hopper disposed beneath the perforated portion of the drum, a heater casing surrounding the drum, a heater disposed within the casing, a hopper discharging into the inlet end of the drum, means for rotating the drum, and means for controlling the heat within the casing.

2. Means for treating material to exterminate insects therein comprising a heater casing ovoidal in cross section, a rotatable drum disposed in the upper portion of the casing, imperforate for the greater portion of its length but perforated at one end and open at this end, the drum being formed with longitudinally extending ribs, means disposed within the drum for causing the feeding of material from one end toward the perforated end of the drum, and a burner disposed within the lower portion of the casing.

3. Means for treating material to exterminate insects therein comprising a shaft, a drum mounted thereon to rotate therewith and open at its outer end, the drum being imperforate for the greater portion of its length perforated at its outlet end, a hopper disposed beneath the perforated end of the drum, a casing surrounding the drum and extending below it, a burner disposed within the casing and extending beneath the imperforate portion of the drum, ribs disposed upon the interior face of the drum and extending longitudinally, a feeding device comprising a helical blade concentric to the shaft of the drum, and rotatable therewith, a hopper discharging into the inlet end of the drum, and means driven by the shaft for feeding material from the hopper into the drum.

In testimony whereof I hereunto affix my signature in the presence of two witnesses.

NEAL CROSS.

Witnesses:
E. M. JAMESON,
W. M. GWYN.